United States Patent [19]
Ratliff

[11] Patent Number: 5,409,099
[45] Date of Patent: Apr. 25, 1995

[54] CONVEYOR SYSTEM FOR CONVEYING COAL OUT OF COAL MINE

[76] Inventor: Howard Ratliff, Rte. 1, Box 799H, Pikeville, Ky. 41501

[21] Appl. No.: 166,250

[22] Filed: Dec. 13, 1993

[51] Int. Cl.$^6$ .............................................. B65G 37/00
[52] U.S. Cl. ................................... 198/602; 198/303; 198/860.2
[58] Field of Search ............... 198/303, 314, 570, 579, 198/575, 602, 813, 816, 607, 860.1, 860.2

[56] References Cited

U.S. PATENT DOCUMENTS

| | | | |
|---|---|---|---|
| 2,793,731 | 5/1957 | Manierre | 198/303 |
| 2,923,398 | 2/1960 | Milik | 198/303 |
| 4,007,827 | 2/1977 | Mattos | 198/813 X |
| 4,041,785 | 8/1977 | Roark | 198/813 X |
| 4,090,601 | 5/1978 | Freed, Jr. | 198/813 X |
| 4,159,757 | 7/1979 | Kleysteuber et al. | 198/303 |
| 4,387,798 | 6/1983 | Jamison et al. | 198/303 X |
| 4,925,009 | 5/1990 | Hill | 198/860.2 X |

FOREIGN PATENT DOCUMENTS

| | | | |
|---|---|---|---|
| 0907915 | 3/1946 | France | 198/602 |
| 0969921 | 7/1958 | Germany | 198/602 |
| 0757619 | 9/1956 | United Kingdom | 198/602 |
| 0913429 | 12/1962 | United Kingdom | 198/602 |

Primary Examiner—James R. Bidwell
Attorney, Agent, or Firm—Richard C. Litman

[57] ABSTRACT

A conveyor system for conveying coal out of a coal mine includes a first conveyor and a second conveyor coaxially aligned with the first conveyor. The first conveyor includes a frame having longitudinal side rails and a conveyor tunnel structure having a coal discharge outlet opening located over the side rails at the downstream end thereof. The first conveyor further includes an endless belt structure trained about a head pulley located in the conveyor tunnel and about a tail pulley located proximate the upstream end of the first conveyor frame. A first conveyor drive sprocket is mounted to the head pulley. The second conveyor includes a tail pulley at its downstream end mounted to the conveyor frame of the first conveyor beneath the coal discharge outlet opening of the conveyor tunnel structure, a head pulley, and an endless belt structure trained about the head pulley and tail pulley. A second conveyor driven sprocket is mounted to the second conveyor tail pulley, and a drive belt or chain is trained about the first conveyor drive sprocket and second conveyor driven sprocket. A second conveyor drive sprocket is mounted to the second conveyor head pulley, a drive motor having a drive sprocket is positioned near the downstream end of the second conveyor, and a drive belt or chain is trained about the second drive sprocket and drive sprocket of the drive motor.

6 Claims, 3 Drawing Sheets

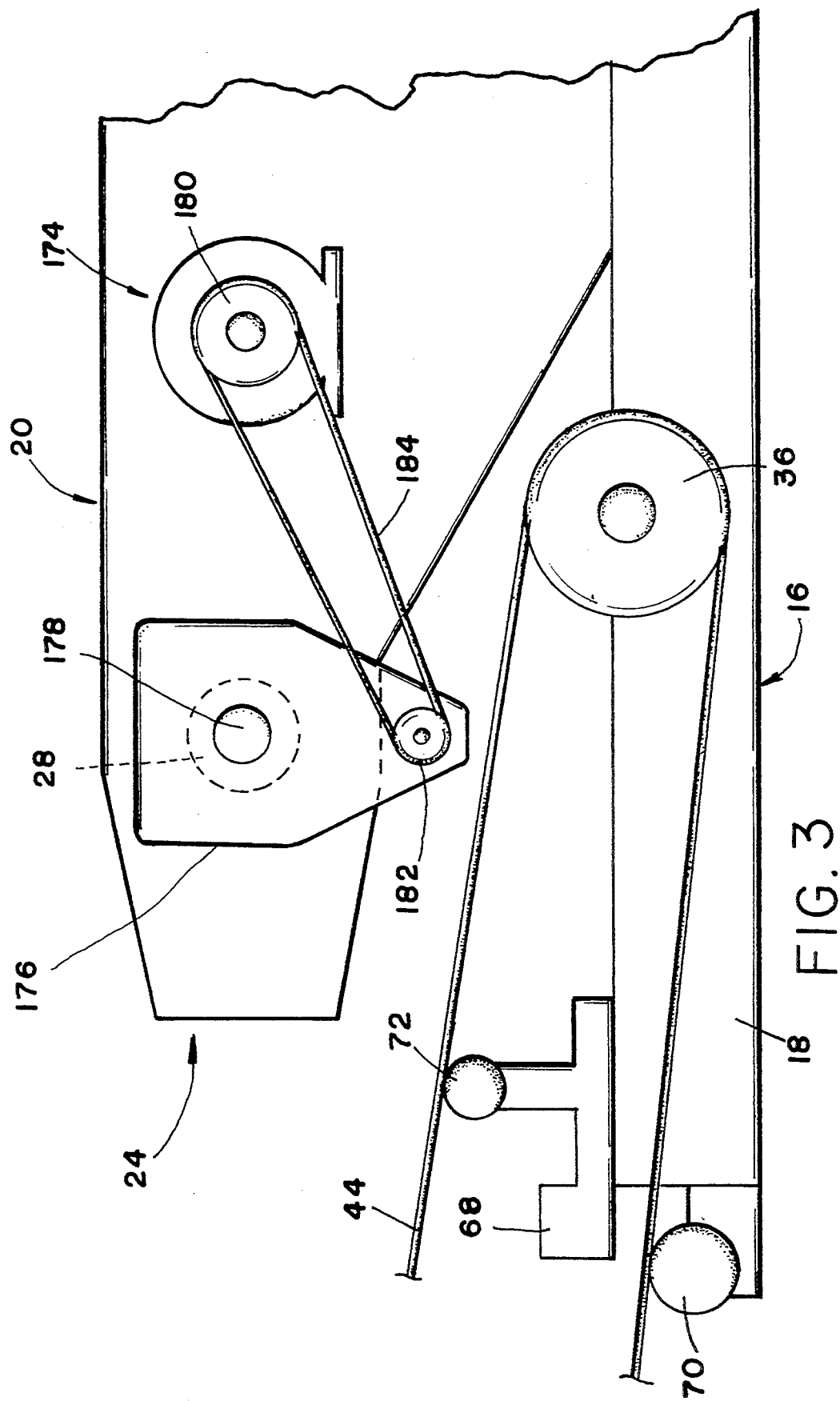

CONVEYOR SYSTEM FOR CONVEYING COAL OUT OF COAL MINE

BACKGROUND OF THE INVENTION

The present invention relates to conveyors, and more particularly to conveyor systems for use in coal mines.

Conveyor systems are used, in coal mines for conveying mined coal from deep inside the mine to the mouth of the mine. Coal mines have extremely low ceiling and, therefore, a very restricted vertical clearance for accommodating conveyor systems.

The conveyor systems known to me include an upstream or first conveyor located deep inside the mine, and a downstream or second conveyor in coaxial alignment with the first conveyor extending from the first conveyor to the mouth of the coal mine.

The structure of these conveyor systems known to me are quite high relative to the ceiling height of a coal mine.

These conveyor systems known to me further require separate drive motors for each of the upstream and downstream conveyors. The requirement for separate drive motors, and the associated drive system, compounds the complexity of the conveyor systems, and adds to the cost of energy to operate these conveyor systems. The drive motors are typically electric motors, and the requirement of separate electric drive motors necessitates extremely long runs of electrical conduits from a source of electrical energy outside the mine to the drive motor of the upstream conveyor deep within the mine.

SUMMARY OF THE INVENTION

The present invention recognizes the drawbacks of the heretofore-known conveyor systems for conveying coal out of a coal mines and provides a practical solution.

The present invention provides a conveyor system for conveying coal out of a coal mine which has a minimum height.

The present invention also provides a conveying system of the class described which requires only a single drive motor for operating both the upstream and downstream conveyors.

More particularly, the present invention provides a conveyor system for conveying mined coal out of a coal mine comprising a first conveyor comprising a conveyor frame, a conveyor tunnel structure at the downstream end of the first conveyor secured to the conveyor frame and extending upwardly therefrom to an elevation above the side rails, the conveyor tunnel having a coal discharge outlet opening at an elevation above the side rails and spaced inwardly longitudinally of the side rails from the downstream end of the first conveyor frames a tail pulley at the upstream end of the conveyor frames a head pulley in the conveyor tunnel proximate the coal discharge outlet opening, the head pulley being at a higher elevation than the tail pulley, endless conveyor belt means trained about the head pulley and the tail pulley, a first conveyor drive sprocket coaxially mounted with the head pulleys a second conveyor in longitudinal alignment with the first conveyor comprising a tail pulley mounted to the conveyor frame of the first conveyor beneath the head pulley of the first conveyor and located inwardly longitudinally of the first conveyor frame from the downstream end of the first conveyor frame and from the head pulley of the first conveyor, a second conveyor driven sprocket coaxially mounted to the tail pulley of the second conveyor, drive belt means trained about the first conveyor drive sprocket and the second conveyor driven sprocket, a head pulley, endless conveyor belt means trained about the head and tail such that the top flight of the endless conveyor belt means of the second conveyor extends beneath the coal discharge outlet opening of the conveyor tunnel of the first conveyor, a second conveyor drive sprocket coaxially mounted to the head pulley of the second conveyor, conveyor drive motor means proximate the head pulley of the second conveyor having a motor drive sprocket attached to the motor output shafts and drive belt means trained about the motor drive sprocket and the first conveyor drive sprocket so that the drive motor means drives both the first conveyor and the second conveyor.

BRIEF DESCRIPTION OF THE DRAWINGS

A better understanding of the present invention will be had upon reference to the accompanying description in conjunction with the accompanying drawings in which like numeral refer to like parts throughout the views and wherein.

DETAILED DESCRIPTION OF THE PREFERRED EMBODIMENT

Figure 1:
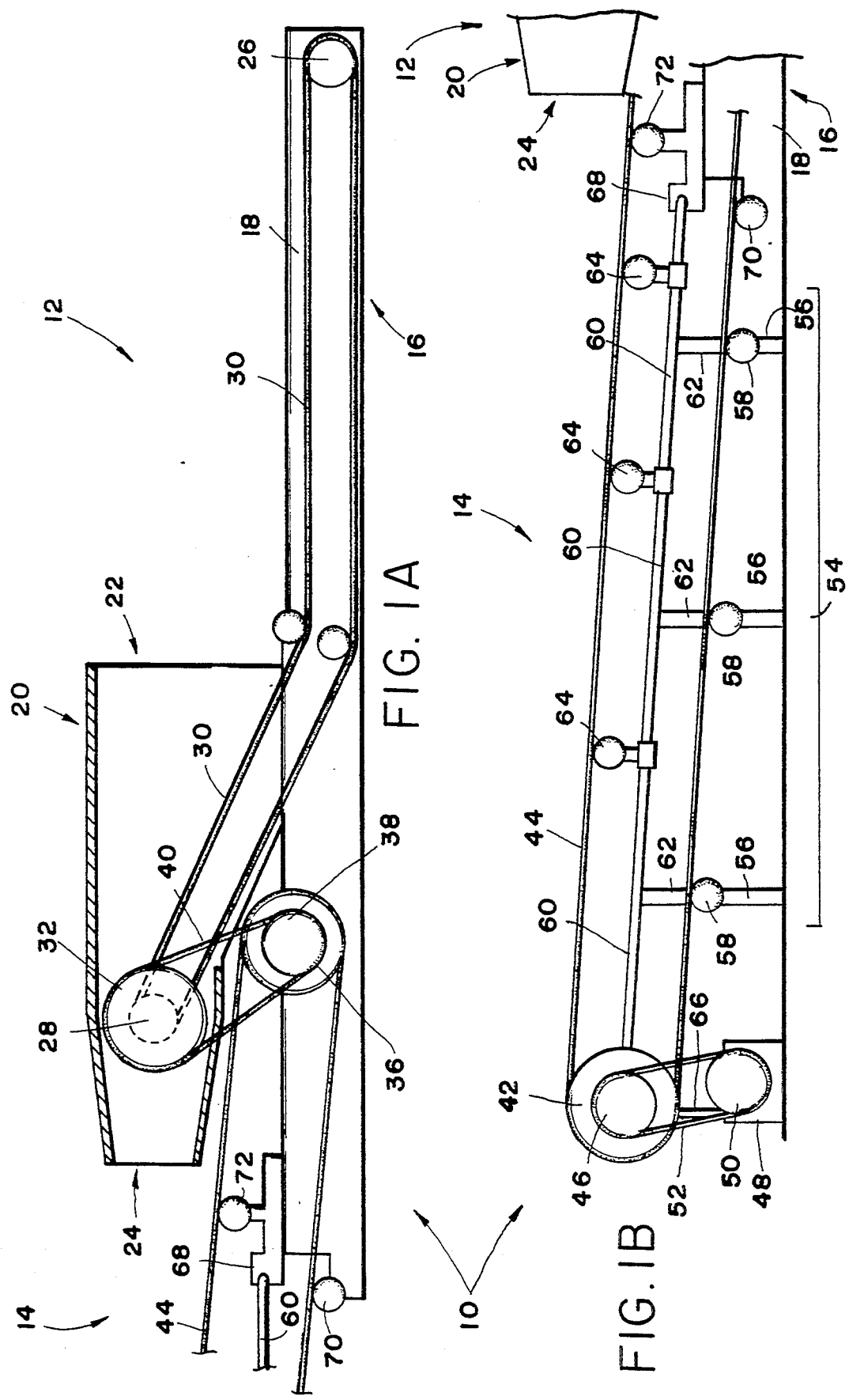
FIGS. 1A and 1B viewed together in end to end relationship show a schematic side view, partially in cross-section of a coal mine conveyor system of the present invention.

With reference to FIG. 1, there is shown a conveyor system, generally denoted as the numeral 10, of the present invention for conveying mined coal out of coal mines to the mouth of the coal mine.

The coal mine conveyor system 10 includes a first or upstream conveyor 12 which is to be located deep inside the coal mine, and a second or downstream conveyor 14 in longitudinal alignment with the first conveyor at the downstream end thereof. The second conveyor 14 extends from the first conveyor 12 to the mouth of the coal mine.

The first or upstream conveyor 12 has a very low profile and includes a conveyor frame 16 comprising two parallel spaced-apart longitudinal side rails 18 with appropriate cross-braces (not shown). A conveyor tunnel structure 20 is secured to the longitudinal side rails 18 and is spaced inwardly from the downstream end of the conveyor frame 16 longitudinally of the frame side rails 18. The conveyor tunnel structure 20 extends generally upwardly from the frame side rails 18 to an elevation above the frame side rails 18. The conveyor tunnel structure 20 has a conveyor inlet opening 22 at the bottom or upstream end thereof at the frame side rails 18 and a coal discharge outlet opening 24 at the top or downstream end thereof spaced above the frame side rails 18. A conveyor tail pulley 26 is mounted to the conveyor frame 16 proximate the upstream end extending perpendicularly between the frame side rails 18 and is journal mounted to the frame side rails 18. A conveyor head pulley 28, parallel to the tail pulley 26, is located at the downstream or discharge end of the first conveyor 12 inside the conveyor tunnel structure 20 between the conveyor opening 22 and the coal discharge outlet opening 24, and is journal mounted to the conveyor tunnel structure 20. Therefore, the head pulley 28 is at a higher elevation than the tail pulley 26. Endless conveyor means 30, such at coupled slats or an endless belt, is trained about the tail pulley 26 and head pulley 28. A first conveyor drive wheel 32, such as a belt sheave or chain sprocket, is drivingly coaxially mounted to the head pulley 28.

The second or downstream conveyor 14 is located at the downstream end of the first conveyor 12 and disposed in longitudinal alignment with the first conveyor 12. The second conveyor 14 includes a tail pulley 36 journal mounted to the conveyor frame 16 of the first conveyor 12 beneath the head pulley 28 of the first conveyor 12 and spaced inwardly of the first conveyor 12 longitudinally of the first conveyor frame side rails 18 from the downstream end of the conveyor frame 12, and also spaced inwardly of the first conveyor longitudinally of the first eonveyor side rails 18 relative to the position of the head pulley 28 of the first conveyor 12. A second conveyor driven wheel 38, such as a belt sheave or chain sprocket, is drivingly coaxially mounted to the tail pulley 36 of the second conveyor 14. The first conveyor drive wheel 32 and second conveyor drive wheel 38 are drivingly interconnected so that as the tail pulley 36 of the second conveyor 14 is rotated, the head pulley 28 of the first conveyor 12 is rotated. Toward this objective, the first conveyor drive wheel 32 and second conveyor drive wheel 38 are drivingly interconnected by interconnecting means 40, for example, an endless drive belt or endless drive chain. The second conveyor 14 also includes a head pulley 42 spaced from the tail pulley 36 located at the downstream end of the second conveyor 14 and an endless belt 44 trained about the head pulley 42 and tail pulley 36. Due to the location of the tail pulley 36 of the second conveyor 14 being located inside the frame 16 of the first conveyor 12, the top flight of the conveyor belt 44 of the second conveyor 14 extends beneath the coal discharge outlet opening 24 of the conveyor tunnel structure 20 and the downstream end of the first conveyor 12 overlaps the upstream end of the second conveyor 14 to receive coal therefrom. A conveyor system driver wheel 46 such as a belt sheave or chain sprockets is drivingly coaxially mounted to the head pulley 42 of the second conveyor 14. A driven motor 48 is located near the second conveyor head pulley 42 and has a driving wheel 50, such as a belt sheave or chain sprocket, mounted on the output shaft of the drive motor 48. The conveyor system driver wheel 46 and second conveyor head pulley 42 are drivingly interconnected so that as the drive motor 48 rotates the driving wheel 48, the head pulley 42 of the second conveyor 14 is rotated. Toward this objectives the driving wheel 50 and second conveyor driver wheel 46 are drivingly interconnected by interconnecting means 52, for example, an endless drive belt or endless drive chain. As shown, the second conveyor 14 includes a frame structure, generally denoted as the numeral 54, which comprises a plurality of first stands 56 spaced apart along the length of the second conveyor 14 and anchored to the coal mine floor. Each first stand 56 has a belt tensioning roller 58 in contact with the bottom surface of the bottom flight of the endless belt 44. The first stands 56 are interconnected by a cable or rods 60, and a plurality of second stands 62 are mounted to the cable or rods 60. Each second stand 62 has a belt tensioning roller 64 in contact with the bottom surface of the top flight of the endless belt 44. The head pulley 42 of the second conveyor 14 is mounted on a pedestal 66 secured to the mine floor and the downstream one of the cable or rods 60 is secured to the pedestal 66. The upstream one of the cable or rods 60 of the frame structure of the second conveyor 14 is secured to the downstream end of the first conveyor frame 16 by means of a cable anchor fixture 68 attached to the downstream end of the longitudinal side rails 18 of the first conveyor 12. A bottom flight tensioning roller 70 is mounted to the downstream ends of the longitudinal side rails 18 of the first conveyor frame 16 and is in contact with the bottom surface of the bottom flight of the endless belt 44. Also, a top flight tensioning roller 72 is mounted to the downstream ends of the longitudinal side rails 18 of the first conveyor frame 16 and is in contact with the bottom surface of the top flight of the conveyor belt 44. The stand and rod construction of the frame structure 54 of the second conveyor 14 allows the length of the second conveyor 14 to be extended by adding first stands 56 and cables or rods 60 and second stands 62.

In operation of the coal mine conveyor system 10, with the tail pulley 36 of the second conveyor 14 drivingly connected to the head pulley 28 of the first conveyor 12 both the second conveyor 14 and the first conveyor 12 are driven by the same drive motor 48. This feature has the advantage of locating the drive motor for both conveyors at a single location and that location is near the entrance to the mine where it is accessible for maintenance and repair. Another advantage is that by locating the drive motor at the downstream end of the second conveyor 14, the height of the first conveyor 12 is a minimum so that the first conveyor 12 will readily fit into the low overhead space available deep inside a coal mine. The linear conveying speed of the second or downstream conveyor 14 is preferably faster than the linear conveying speed of the first or upstream conveyor 12. It has been determined that a 3 to 1 conveying speed ratio is desirable. Therefore, if for example the endless belt 44 of the second conveyor 14 is driven at a linear speed of 300 feet per minute, the endless conveyor means 30 of the first conveyor 12 is driven at a linear speed of 100 feet per minute.

Figure 2:
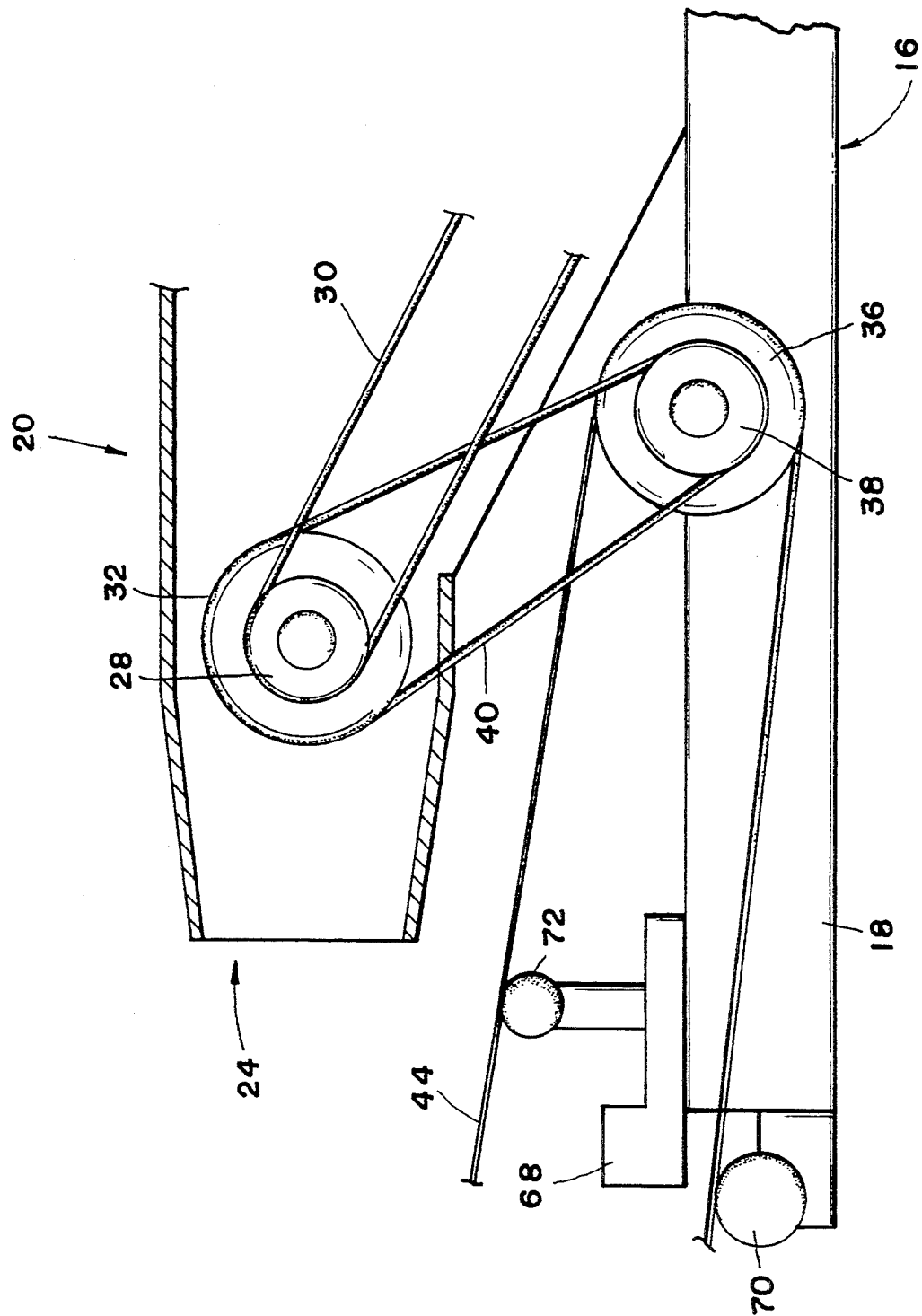
FIG. 2 is an enlarged side view, partially in cross-section of a portion of the conveyor system of FIG. 1 showing a drive system for the first conveyor; and, FIG. 3 is an enlarged side view of a portion of the conveyor system showing an alternative drive system for the first conveyor.

Now with reference to FIG. 3, there is shown an alternative drive for the first or upstream conveyor 12. All of the other features of the conveyor system of FIG. 3 are identical to the conveyor system of FIGS. 1A, 1B and 2 and, therefore, for the sake of brevity the description thereof will not be repeated and these common features are identified by identical numerals. In the embodiment of FIG. 3, the downstream conveyor 14 and upstream conveyor 12 are independently driven. Toward this objective, the first conveyor driven wheel 32, the second conveyor driven wheel 38, and the interconnecting means 40 (endless drive belt or drive chain) are eliminated. In place of these components, a first conveyor drive motor 174 is located near the first conveyor head pulley 28, and a speed reducer device 176 is located immediately adjacent the head pulley 28 with the output shaft of the speed reducer device 176 coaxial to and directly drivingly connected to the head pulley shaft 178 of the first conveyor 12. A driving wheel 180, such as a belt sheave or chain sprocket, is coaxially mounted to the output shaft of the drive motor 174, and a driven wheel 182, such as a belt sheave or chain sprocket, is coaxially mounted to the input shaft of the speed reducer device 176. The driving wheel 180 and the driven wheel 182 are drivingly interconnected so that as the driving wheel 180 is rotated by the drive motor 174, the driven wheel 182 of the speed reducer device 176 is rotated. Toward this objective, the driving wheel 180 and driven wheel 182 are drivingly interconnected by interconnecting means 184, for example, an endless drive belt or endless drive chain.

The following detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. A conveyor system for conveying coal out of a coal mine, comprising:
   a. a first conveyor comprising:
      a conveyor frame including longitudinal side rails;
      a conveyor tunnel structure secured to the longitudinal side rails and extending upwardly therefrom to an elevation above the side rails, the conveyor tunnel structure having a coal discharge outlet opening at an elevation above the side rails and located inwardly longitudinally of the side rails from the downstream end of the conveyor frame side rails;
      a tail pulley at the upstream end of the conveyor frame;
      a head pulley in the conveyor tunnel structure proximate the coal discharge outlet opening, the head pulley being at a higher elevation than the tail pulley;
      endless conveyor belt means trained about the head pulley and the tail pulley; and
      a first conveyor drive wheel coaxially mounted with the head pulley;
   b. a second conveyor in longitudinal alignment with the first conveyor, comprising:
      a tail pulley mounted to the conveyor frame of the first conveyor beneath the head pulley of the first conveyor and located inwardly longitudinally of the side rails from the downstream end of the conveyor frame side rails and from the head pulley of the first conveyor;
      a second conveyor driven wheel coaxially mounted to the tail pulley of the second conveyor;
      interconnecting drive means for interconnecting the first conveyor drive wheel and the second conveyor driven wheel;
      a head pulley;
      endless conveyor belt means trained about the head and tail pulley such that the top flight of the endless conveyor belt means extends beneath the coal discharge outlet opening of the conveyor tunnel structure of the first conveyor;
      a conveyor system driver wheel coaxially mounted to the head pulley of the second conveyor; and
   c. conveyor drive motor means proximate the head pulley of the second conveyor having a motor drive wheel attached to the motor output shaft;
   d. interconnecting drive means for interconnecting the motor drive wheel and the conveyor system driver wheel so that the conveyor drive motor means drives both the first conveyor and the second conveyor;
   e. a bottom flight tensioning roller mounted to the downstream ends of the longitudinal side rails of the first conveyor frame and in contact with the bottom surface of the bottom flight of the endless belt of the second conveyor; and
   f. a top flight tensioning roller mounted to the downstream ends of the longitudinal side rails of the first conveyor frame and in contact with the bottom surface of the top flight of the endless belt of the second conveyor.

2. The conveyor system of claim 1, wherein the downstream end of the first conveyor overlaps the upstream end of the second conveyor.

3. The conveyor system of claim 1, wherein the second conveyor comprises a frame structure secured to the downstream end of the longitudinal frame rails of the first conveyor.

4. A conveyor system for conveyor coal out of a coal mine, comprising:
   a. a first conveyor comprising:
      a conveyor frame including longitudinal side rails;
      a conveyor tunnel structure secured to the longitudinal side rails, the conveyor tunnel structure having a coal discharge outlet opening at an elevation above the side rails and located inwardly longitudinally of the side rails from the downstream end of the conveyor frame side rails;
      a tail pulley at the upstream end of the conveyor frame;
      a head pulley in the conveyor tunnel structure proximate the coal discharge outlet opening, the head pulley being at a higher elevation than the tail pulley;
      endless conveyor belt means trained about the head pulley and the tail pulley;
      a drive motor;
      a speed reducer device connected to the head pulley of the first conveyor;
      interconnecting drive means for interconnecting the drive motor and the speed reducer device for driving the first conveyor;
   b. a second conveyor in longitudinal alignment with the first conveyor, comprising:
      a tail pulley mounted to the conveyor frame of the first conveyor beneath the head pulley of the first conveyor and located inwardly longitudinally of the side rails from the downstream end of the conveyor frame side rails and from the head pulley of the first conveyor;
      a head pulley;
      endless conveyor belt means trained about the head and tail pulleys such that the top flight of the endless conveyor belt means extends beneath the coal discharge outlet opening of the conveyor tunnel structure of the first conveyor;
      a conveyor system driver wheel coaxially mounted to the head pulley of the second conveyor; and
   c. conveyor drive motor means proximate the head pulley of the second conveyor, and having a motor drive wheel attached to the motor output shaft; and
   d. interconnecting drive means for interconnecting the motor drive wheel and the conveyor system driver wheel so that the drive motor means drives only the second conveyor e. a bottom flight tensioning roller mounted to the downstream ends of the longitudinal side rails of the first conveyor frame and in contact with the bottom surface of the bottom flight of the endless belt of the second conveyor; and f. a top flight tensioning roller mounted to the downstream ends of the longitudinal side rails of the first conveyor frame and in contact with the bottom surface of the top flight of the endless belt of the second conveyor.

5. The conveyor system of claim 4, wherein the downstream end of the first conveyor overlaps the upstream end of the second conveyor.

6. The conveyor system of claim 4, wherein the second conveyor comprises a frame structure secured to the downstream end of the longitudinal frame rails of the first conveyor.

* * * * *